(12) United States Patent
Martin et al.

(10) Patent No.: US 12,038,032 B2
(45) Date of Patent: Jul. 16, 2024

(54) CONNECTING RING WITH AN AXIAL LIMITING FEATURE

(71) Applicant: Cummins Inc., Columbus, IN (US)

(72) Inventors: John J. Martin, Vallonia, IN (US); Nilesh Chaudhari, Seymour, IN (US)

(73) Assignee: Cummins Inc., Columbus, IN (US)

( * ) Notice: Subject to any disclaimer, the term of this patent is extended or adjusted under 35 U.S.C. 154(b) by 294 days.

(21) Appl. No.: 16/771,550

(22) PCT Filed: Dec. 14, 2017

(86) PCT No.: PCT/US2017/066382
§ 371 (c)(1),
(2) Date: Jun. 10, 2020

(87) PCT Pub. No.: WO2019/117916
PCT Pub. Date: Jun. 20, 2019

(65) Prior Publication Data
US 2020/0309170 A1  Oct. 1, 2020

(51) Int. Cl.
*F16L 23/08* (2006.01)
*F16B 2/08* (2006.01)
*F16B 7/04* (2006.01)

(52) U.S. Cl.
CPC .............. *F16B 2/08* (2013.01); *F16B 7/0426* (2013.01); *F16L 23/08* (2013.01)

(58) Field of Classification Search
CPC . F16B 23/00; F16L 23/08; F16L 23/04; F16L 23/12; F16L 33/28; F16L 55/0335; F16L 55/03337

USPC ..... 285/234, 337, 407, 408, 365, 50, 49, 48, 285/366, 367
See application file for complete search history.

(56) References Cited

U.S. PATENT DOCUMENTS

| | | | |
|---|---|---|---|
| 3,404,905 A | | 10/1968 | Albrecht |
| 3,406,991 A | * | 10/1968 | Decker, Jr. .............. F16L 23/04 403/182 |
| 4,163,571 A | | 8/1979 | Nash |

(Continued)

FOREIGN PATENT DOCUMENTS

| | | |
|---|---|---|
| DE | 2325910 A1 | 12/1974 |
| DE | 19749251 A1 | 5/1999 |

(Continued)

OTHER PUBLICATIONS

EP0856696 translation (Year: 1998).*

(Continued)

*Primary Examiner* — Aaron M Dunwoody
(74) *Attorney, Agent, or Firm* — Faegre Drinker Biddle & Reath LLP

(57) ABSTRACT

A clamp system (10) is provided for providing secure attachment of at least two connecting members (12, 14), and includes a connecting ring (16) having a flange portion (38) extending in an axial direction relative to a longitudinal axis of the connecting ring (16). The flange portion (38) is configured to limit axial movement of the connecting ring (16). Also included in the clamp system (10) is a coupling clamp (18) configured to create a force for the clamp system (10) when the coupling clamp (18) is fastened with the connecting ring (16) such that the at least two connecting members (12, 14) are securely attached by the fastened coupling clamp (18).

20 Claims, 8 Drawing Sheets

(56) References Cited

U.S. PATENT DOCUMENTS

| | | |
|---|---|---|
| 4,175,754 A | 11/1979 | Wilhelm |
| 4,655,481 A | 4/1987 | Prueter |
| 4,925,370 A | 5/1990 | Tallarita |
| 5,608,626 A | 3/1997 | Ibamoto et al. |
| 5,842,376 A | 12/1998 | Dresden et al. |
| 7,261,670 B2 | 8/2007 | Endo et al. |
| 8,205,916 B2 | 6/2012 | Dallas et al. |
| 8,328,243 B2 | 12/2012 | Matthis et al. |
| 8,568,270 B2 | 10/2013 | Terakawa et al. |
| 8,579,751 B2 | 11/2013 | Phillips |
| 8,590,944 B2 | 11/2013 | Johnson et al. |
| 8,662,544 B2 | 3/2014 | Broderick et al. |
| 8,770,327 B2 | 7/2014 | Yamada et al. |
| 8,795,131 B2 | 8/2014 | Yamazaki et al. |
| 8,939,240 B2 | 1/2015 | Wehrwein et al. |
| 9,194,523 B2 | 11/2015 | Ignaczak et al. |
| 9,376,114 B2 | 6/2016 | Hemphill |
| 2003/0197380 A1 | 10/2003 | Chelchowski et al. |
| 2006/0090435 A1 | 5/2006 | Wen-Pin et al. |
| 2006/0175833 A1 | 8/2006 | Tenglund |
| 2008/0041336 A1 | 2/2008 | Gibson et al. |
| 2009/0062063 A1 | 3/2009 | Yamanaka et al. |
| 2009/0233757 A1 | 9/2009 | Soliman et al. |
| 2010/0173746 A1 | 7/2010 | Ideshio et al. |
| 2011/0005212 A1 | 1/2011 | Matsushita et al. |
| 2011/0021311 A1 | 1/2011 | Kim et al. |
| 2011/0130903 A1 | 6/2011 | Heisel et al. |
| 2011/0313602 A1 | 12/2011 | Hirata et al. |
| 2012/0010792 A1 | 1/2012 | Nedorezov et al. |
| 2012/0115675 A1 | 5/2012 | Glueckler et al. |
| 2012/0116665 A1 | 5/2012 | Aoki et al. |
| 2012/0130609 A1 | 5/2012 | Jess et al. |
| 2012/0309585 A1 | 12/2012 | Whitney et al. |
| 2013/0325227 A1 | 12/2013 | Whitney et al. |
| 2014/0121872 A1 | 5/2014 | Oh et al. |
| 2015/0066316 A1 | 3/2015 | Fujii et al. |
| 2015/0088392 A1 | 3/2015 | Yu et al. |
| 2015/0258886 A1 | 9/2015 | Aimo et al. |
| 2016/0339920 A1 | 11/2016 | Banker et al. |
| 2018/0274463 A1 | 9/2018 | Perfetto et al. |
| 2020/0309170 A1 | 10/2020 | Martin et al. |

FOREIGN PATENT DOCUMENTS

| | | |
|---|---|---|
| DE | 102008021326 A1 | 11/2008 |
| DE | 102015210960 A1 | 8/2016 |
| EP | 0707170 A1 | 4/1996 |
| EP | 0856696 A2 | 8/1998 |
| EP | 2539619 A1 | 1/2013 |
| WO | 2008/090236 A1 | 7/2008 |
| WO | 2011/103965 A1 | 9/2011 |
| WO | 2014/174526 A1 | 10/2014 |
| WO | 2015/152990 A1 | 10/2015 |

OTHER PUBLICATIONS

International Search Report and Written Opinion issued by the ISA/Commissioner for Patents, dated Apr. 9, 2018, for International Application No. PCT/US2017/066382; 10 pages.

* cited by examiner

CONNECTING RING WITH AN AXIAL LIMITING FEATURE

CROSS-REFERENCE TO RELATED APPLICATIONS

The present application is a national phase filing of International Patent Application Number PCT/US2017/066382, filed Dec. 14, 2017, the complete disclosure of which is expressly incorporated by reference herein.

FIELD OF THE DISCLOSURE

The present disclosure relates generally to connection systems, and more particularly, to a clamp system having a connecting ring used in connection with a coupling clamp for facilitating secure attachment of at least two connecting members.

BACKGROUND

Conventional connection systems, such as clamp systems, are commonly used to provide secure attachment of at least two connecting members, such as pipes and tubes. For example, the clamp systems are used for providing a mechanical load-transfer and an adequate sealing between the connecting members. Typically, the clamp systems include a connecting ring and a coupling clamp to securely hold respective flange portions of the connect members during use. However, during installation or use of the clamp systems, the connecting ring often becomes displaced or separated from the coupling clamp, resulting in clamp system failures. Such clamp system failures can cause subsequent failures of other adjacent components or systems. For example, the failures include a non-release, a partial separation resulting in an unstable payload, a premature or late release, or a leakage of associated systems. Accordingly, there are opportunities to improve a clamp system so that it provides consistent and reliable attachment of connected members during use or installation.

SUMMARY

A first aspect of the present disclosure provides a clamp system for providing secure attachment of at least two connecting members. The clamp system includes a connecting ring having a flange portion extending in an axial direction relative to a longitudinal axis of the connecting ring. The flange portion is configured to limit axial movement of the connecting ring. Also included in the clamp system is a coupling clamp configured to create a force for the clamp system when the coupling clamp is fastened with the connecting ring such that the at least two connecting members are securely attached by the fastened coupling clamp.

In embodiments, the flange portion of the connecting ring is configured to bias against a protrusion associated with one of the at least two connecting members to limit the axial movement of the connecting ring when the connecting ring is displaced. The connecting ring has a ring portion including an inclined wall sloped at a predetermined angle relative to the longitudinal axis of the connecting ring. The flange portion extends from an end of the inclined wall sloping away from an opposite wall of the ring portion. The opposite wall is substantially transverse to the longitudinal axis of the connecting ring. The coupling clamp has a segment radially extending from an inner surface of the coupling clamp for receiving the ring portion of the connecting ring and the at least two connecting members.

In embodiments, an axial length of the flange portion of the connecting ring is determined based on an axial width of the segment of the coupling clamp relative to the longitudinal axis of the connecting ring.

In embodiments, the clamp system transitions between a clamped position and an unclamped position. When the clamp system is in the unclamped position, a first gap distance between the connecting ring and the coupling clamp is greater than a second gap distance between the connecting ring and a protrusion associated with one of the at least two connecting members. When the clamp system is in the clamped position, the at least two connecting members are clasped together by the connecting ring and the coupling clamp in a secured condition. When the clamp system is in the unclamped position, the connecting ring and the coupling clamp are in a loose condition.

A second aspect of the present disclosure provides a connecting ring used in a clamp system. The connecting ring includes a ring portion having a planar wall substantially transverse to a longitudinal axis of the connecting ring, and an opposite inclined wall sloped at a predetermined angle relative to the longitudinal axis. Also included in the connecting ring is a flange portion extending in an axial direction relative to the longitudinal axis of the connecting ring, and configured to limit axial movement of the connecting ring.

In embodiments, the flange portion extends from an end of the inclined wall sloping away from the planar wall. A distal end of the flange portion is configured to bias against a protrusion associated with a connecting member used in the clamp system to limit the axial movement of the connecting ring when the connecting ring is displaced. The connecting ring has a predetermined clearance between the connecting ring and the protrusion associated with the connecting member directly facing the connecting ring when assembled. The clearance is shorter than a gap distance between the connecting ring and a segment radially extending from an inner surface of the coupling clamp when the clamp system is in a loose condition. The distance between the connecting ring and the segment of the coupling clamp when the clamp system is in the loose condition is determined based on an axial distance of inner edges of the segment and a total width associated with the connecting ring and at least two connecting members used in the clamp system. The total width includes a first width associated with a first connecting member of the at least two connecting members, a second width associated with a second connecting member of the at least two connecting members, and a third width associated with the connecting ring. The first width includes a width of a first flange of the first connecting member, the second width includes a width of a second flange of the second connecting member, and the third width includes a width of the ring portion of the connecting ring.

In embodiments, an axial length of the connecting ring is determined based on the clearance between the connecting ring and the protrusion associated with the connecting member, and the gap distance between the connecting ring and the segment of the coupling clamp.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements, wherein.

Figure 1:
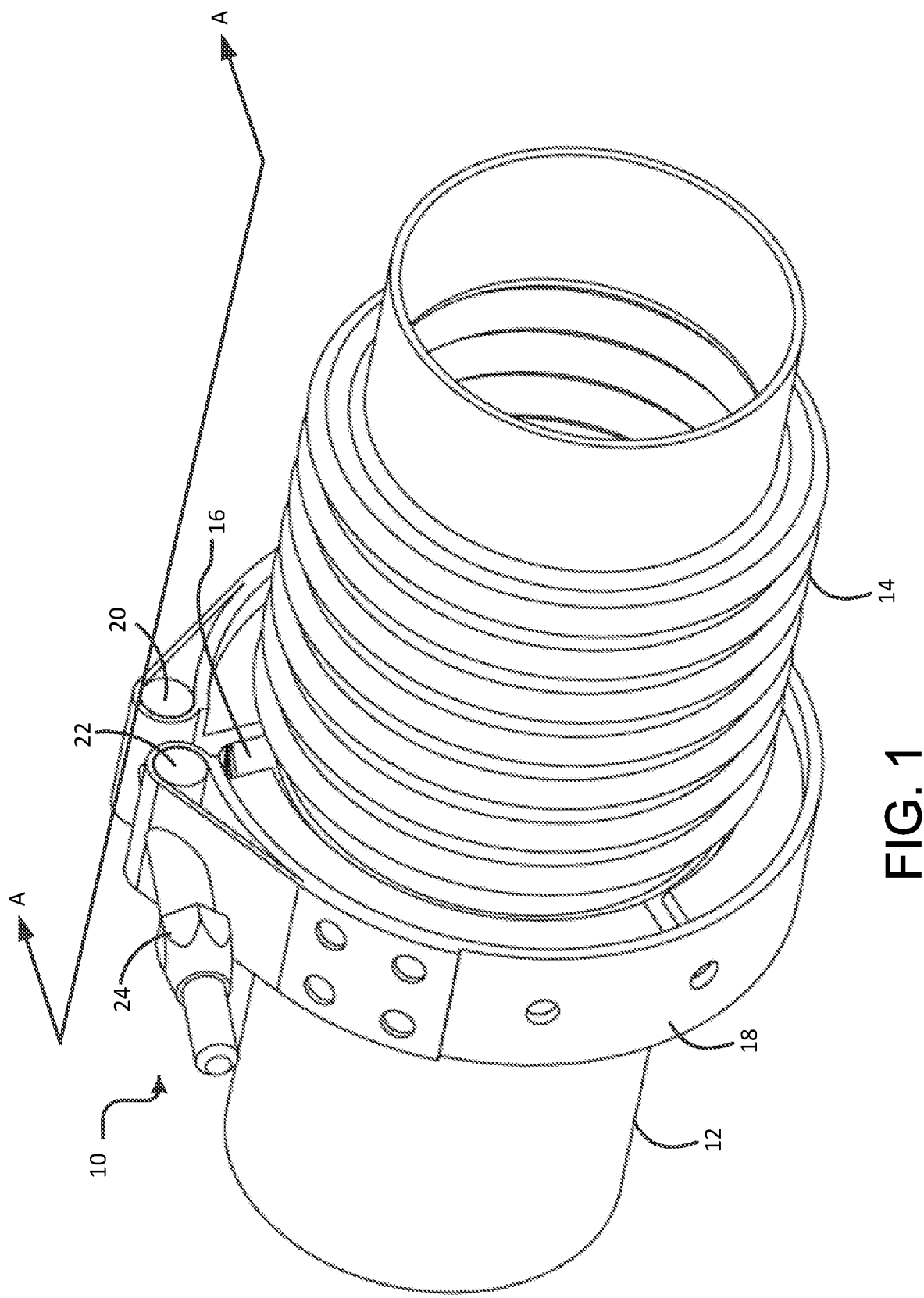
FIG. 1 is a perspective view of a clamp system having a connecting ring and a coupling clamp in accordance with an embodiment of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF EMBODIMENTS

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 2:
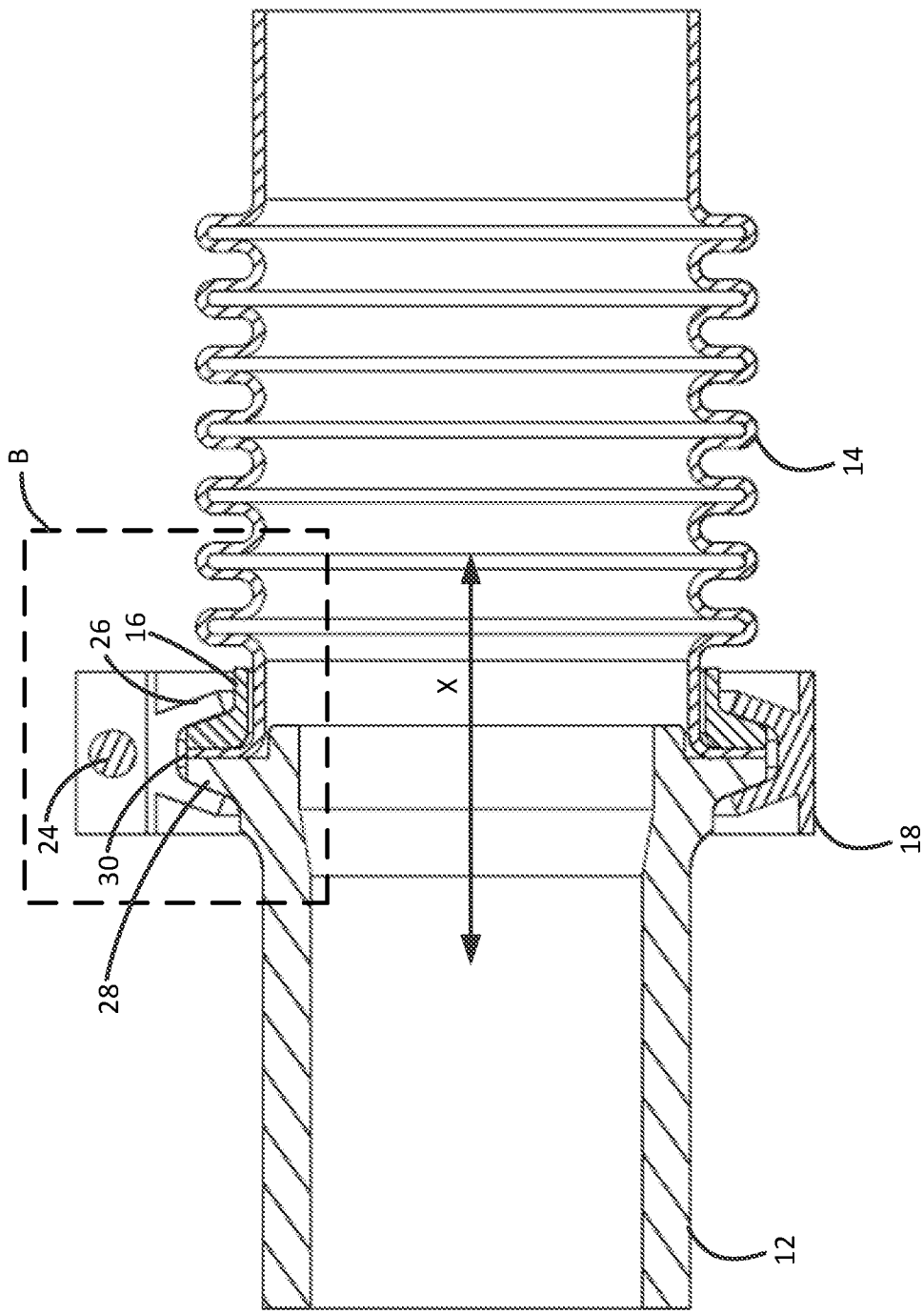
FIG. 2 is a vertical cross-sectional view of the clamp system of FIG. 1 taken along the line A-A in accordance with an embodiment of the present disclosure.

Referring to FIGS. 1 and 2, a clamp system, generally designated 10, configured to provide secure attachment of at least two connecting members 12, 14 is shown. For example, connecting members 12, 14 can include an exhaust pipe, a coolant tube, a bellow connector, or any suitable connecting conduits known in the art. In one embodiment, clamp system 10 includes a connecting ring 16 and a coupling clamp 18 for providing the secure attachment of a first connecting member 12 and a second connecting member 14. In this example, second connecting member 14 is a bellow connector. Attachment of connecting members 12, 14 using connecting ring 16 is achieved by fastening opposite ends 20, 22 of coupling clamp 18 with a fastener 24. Other fastening methods, e.g., using nut and bolt combinations, are also contemplated to suit the application.

FIG. 2 shows a vertical cross-sectional view of clamp system 10 of FIG. 1. In this illustrated embodiment, coupling clamp 18 has a segment 26 being "V"-shaped in cross-section and radially extending from an inner surface of coupling clamp 18. Although "V"-shaped segment 26 is shown for illustration purposes, other suitable types of segment, such as "U"-shaped or "C"-shaped bands, are also contemplated to suit different applications. When coupling clamp 18 is fastened, "V"-shaped segment 26 creates an inward radial force toward a longitudinal axis X of connecting ring 16 such that a first flange 28 of first connecting member 12, a second flange 30 of second connecting member 14, and connecting ring 16 are wedged together inside "V"-shaped segment 26 in an axial direction. As such, the axial force of clamp system 10 provides the tight seal and connection between connecting members 12 and 14. However, during use or installation, connecting ring 16 often becomes loosened in or separated from "V"-shaped segment 26 causing clamp system failures discussed above.

Figure 3:
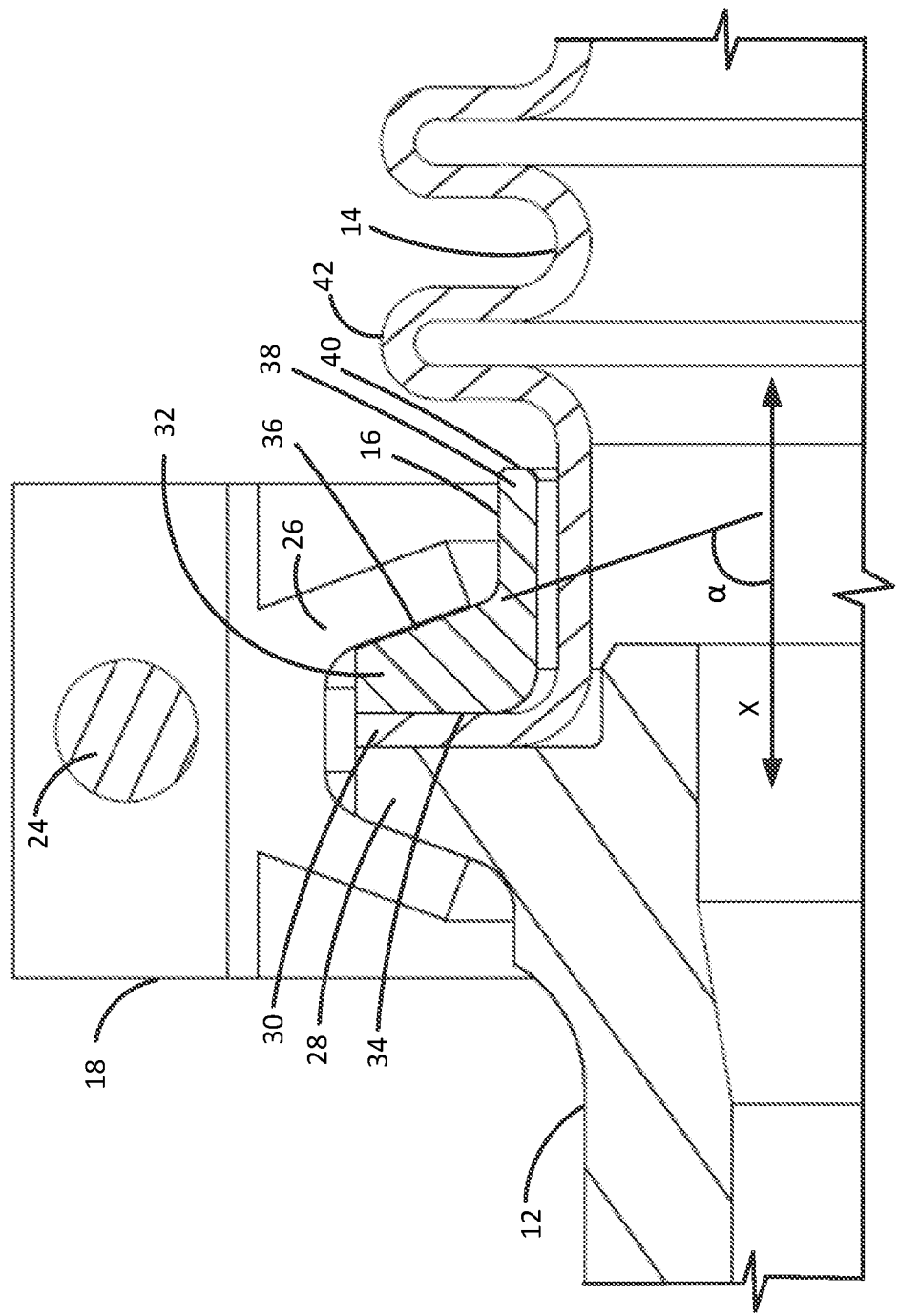
FIG. 3 is an enlarged schematic, cross-sectional view of a portion B of the clamp system of FIG. 2 in a clamped position in accordance with an embodiment of the present disclosure.
Figure 4:
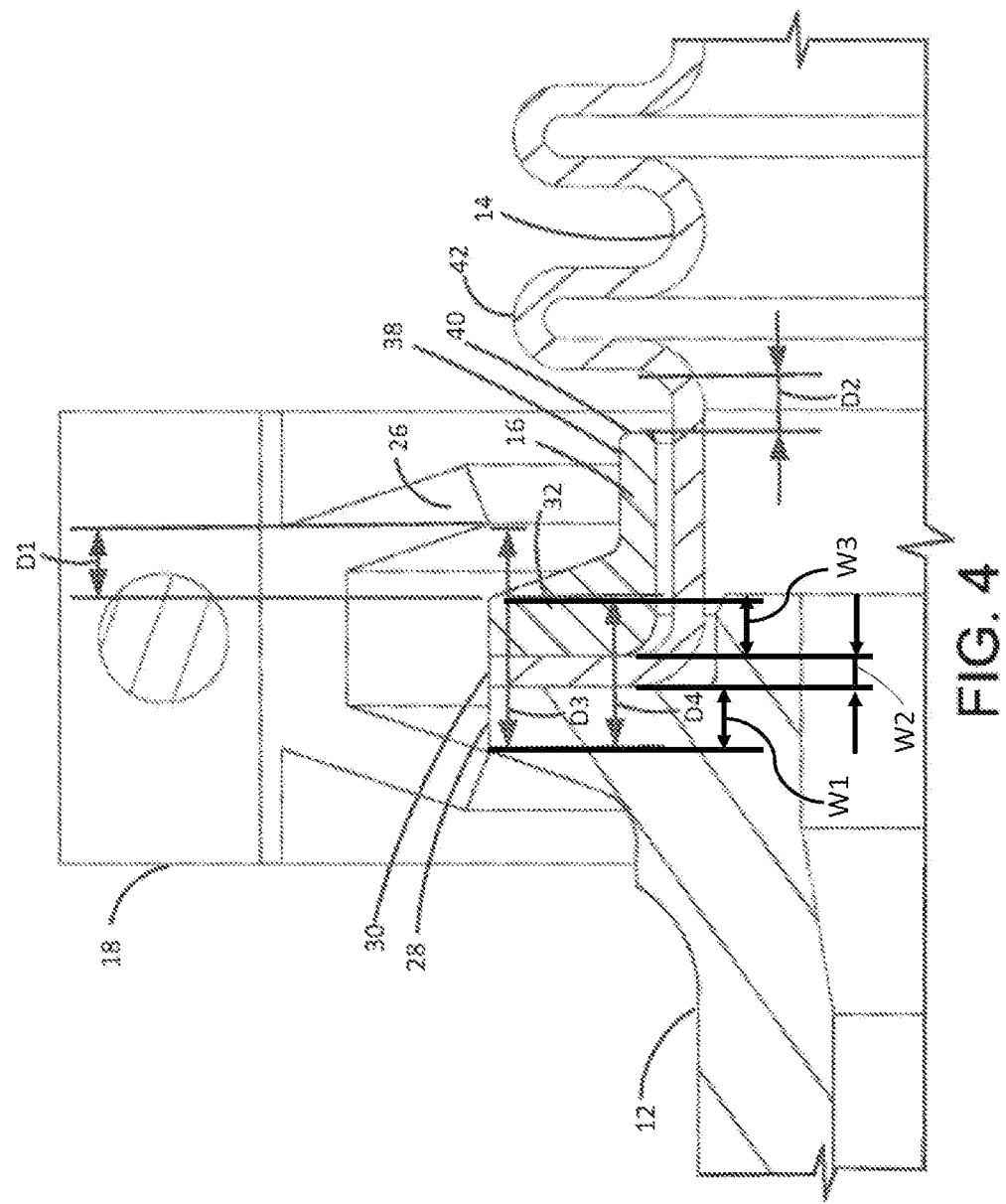
FIG. 4 is an enlarged schematic, cross-sectional view of the portion B of the clamp system of FIG. 2 in an unclamped position in accordance with an embodiment of the present disclosure.

Referring now to FIGS. 3 and 4, a specific configuration of connecting ring 16 prevents or at least mitigates such clamp system failures. Specifically, connecting ring 16 has a radial ring portion 32 including a planar wall 34 substantially transverse to the longitudinal axis X of connecting ring 16 and an opposite inclined wall 36 sloped at a predetermined angle $\alpha$ relative to the longitudinal axis X. Further, connecting ring 16 has a flange portion 38 extending in an axial direction relative to the longitudinal axis X from an end of inclined wall 36 sloping away from planar wall 34. It is advantageous that flange portion 38 provides an axial limiting feature for movement of connecting ring 16 during use or installation.

In this illustrated embodiment, a distal end 40 of flange portion 38 is configured to bias against a protrusion 42 associated with second connecting member 14 to limit axial movement of connecting ring 16 when connecting ring 16 is displaced during use or installation. For example, when connecting ring 16 is moved or displaced by external forces during use or installation, distal end 40 of flange portion 38 can be axially shifted toward protrusion 42. Then, protrusion 42 stops further axial movement of connecting ring 16 by biasing against distal end 40 of flange portion 38 to prevent an unwanted release of connecting ring 16 from coupling clamp 18. In one embodiment, protrusion 42 can be a convolution disposed on an outer surface of the bellow connector, but any suitable protruding portions of second connecting member 14 are contemplated to suit different applications.

In embodiments, clamp system 10 is configured to transition between a clamped position (FIG. 3) and an unclamped position (FIG. 4). The unclamped position refers to a position of clamp system 10 where connecting ring 16 and coupling clamp 18 are in a loose condition, and the clamped position refers to a position of clamp system 10 where first and second connecting members 12 and 14 are clasped together by connecting ring 16 and coupling clamp 18 in a secured condition.

As shown in FIG. 4, when clamp system 10 is in the unclamped position, a first gap distance D1 between ring portion 32 of connecting ring 16 and "V"-shaped segment 26 of coupling clamp 18 is greater than a second gap distance D2 between distal end 40 of flange portion 38 of connecting ring 16 and protrusion 42 of second connecting member 14. The second gap distance D2 represents a predetermined clearance between connecting ring 16 and a first protrusion 42 of second connecting member 14 directly facing connecting ring 16 when assembled. In the illustrated embodiment, the clearance represented by the second gap distance D2 is shorter than the first gap distance D 1. An exemplary relationship between the first gap distance D1 and the second gap distance D2 can be defined by expression (1):

$$D2 < D1 \qquad (1).$$

As such, an axial length of flange portion 38 of connecting ring 16 is determined based on an axial width of "V"-shaped segment 26 of coupling clamp 18 and the clearance between connecting ring 16 and first protrusion 42 of second connecting member 14. For example, the axial length of flange portion 38 is determined based on the first gap distance D1 and the second gap distance D2. Consequently, the flange portion 38 has the axial length that satisfies the relationship where the first gap distance D1 is greater than the second gap distance D2, as shown in expression (1).

As another example, the first gap distance D1 can also be determined based on an axial distance D3 of inner edges of "V"-shaped segment 26 and a total width D4 defined by a first width W1 of first flange 28 of first connecting member 12, a second width W2 of second flange 30 of second connecting member 14, and a third width W3 of ring portion 32 of connecting ring 16. In this illustrated embodiment, the total width D4 is a sum value of the first, second, and third widths when clamp system 10 is in the clamped position. An exemplary first gap distance D1 can be defined by expressions (2) and (3):

$$D1 = D3 - D4 \qquad (2)$$

$$D4 = (W1 + W2 + W3) \qquad (3).$$

In some embodiments, a gasket can be optionally disposed between first connecting member 12 and a second connecting member 14. In such embodiments, the first width W1 includes a thickness of gasket in addition to first flange 28 of first connecting member 12. Any number of gaskets is contemplated to suit different applications.

Figure 5:
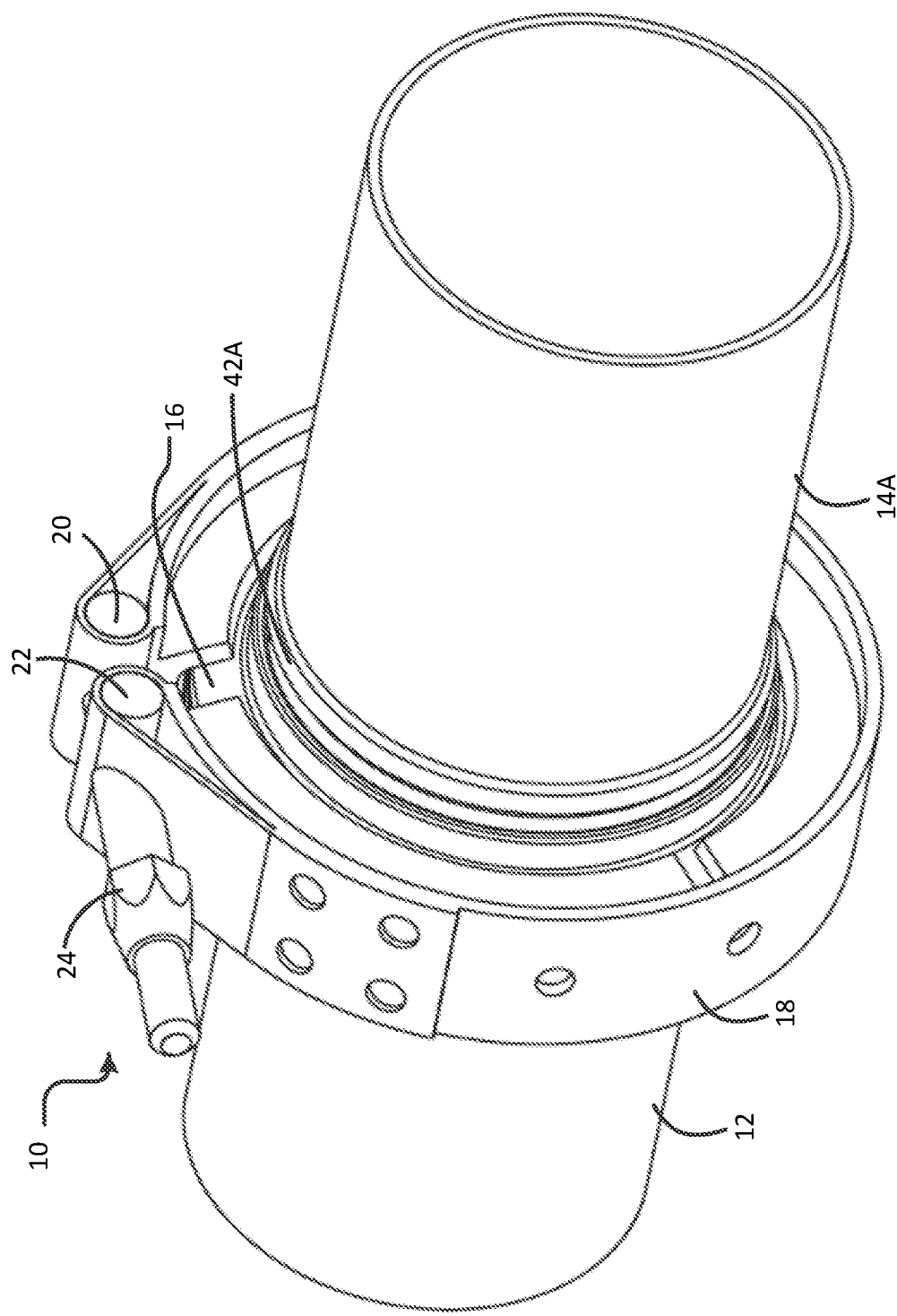
FIG. 5 is a perspective view of the clamp system of FIG. 1 used in connection with a connecting member having a circumferential protrusion in accordance with an embodiment of the present disclosure.

Referring now to FIG. 5, a different type of protrusion 42 of second connecting member 14 is shown. In this embodiment, clamp system 10 is used in connection with a different type of second connecting member 14A having a circumferential protrusion 42A. Like elements shown in FIGS. 1-4 are designated with identical reference numerals. As shown in FIG. 5, protrusion 42A can be any suitable protrusion as long as it is designed to limit axial movement of flange portion 38 of connecting ring 16 during use or installation. Exemplary protrusions include beads, spherical domes, ridges, lumps, bumps, knobs, or the like. In another embodiment, protrusions can be integral with second connecting member 14, but independent, separate protrusions are also contemplated to suit different applications.

Figure 6:
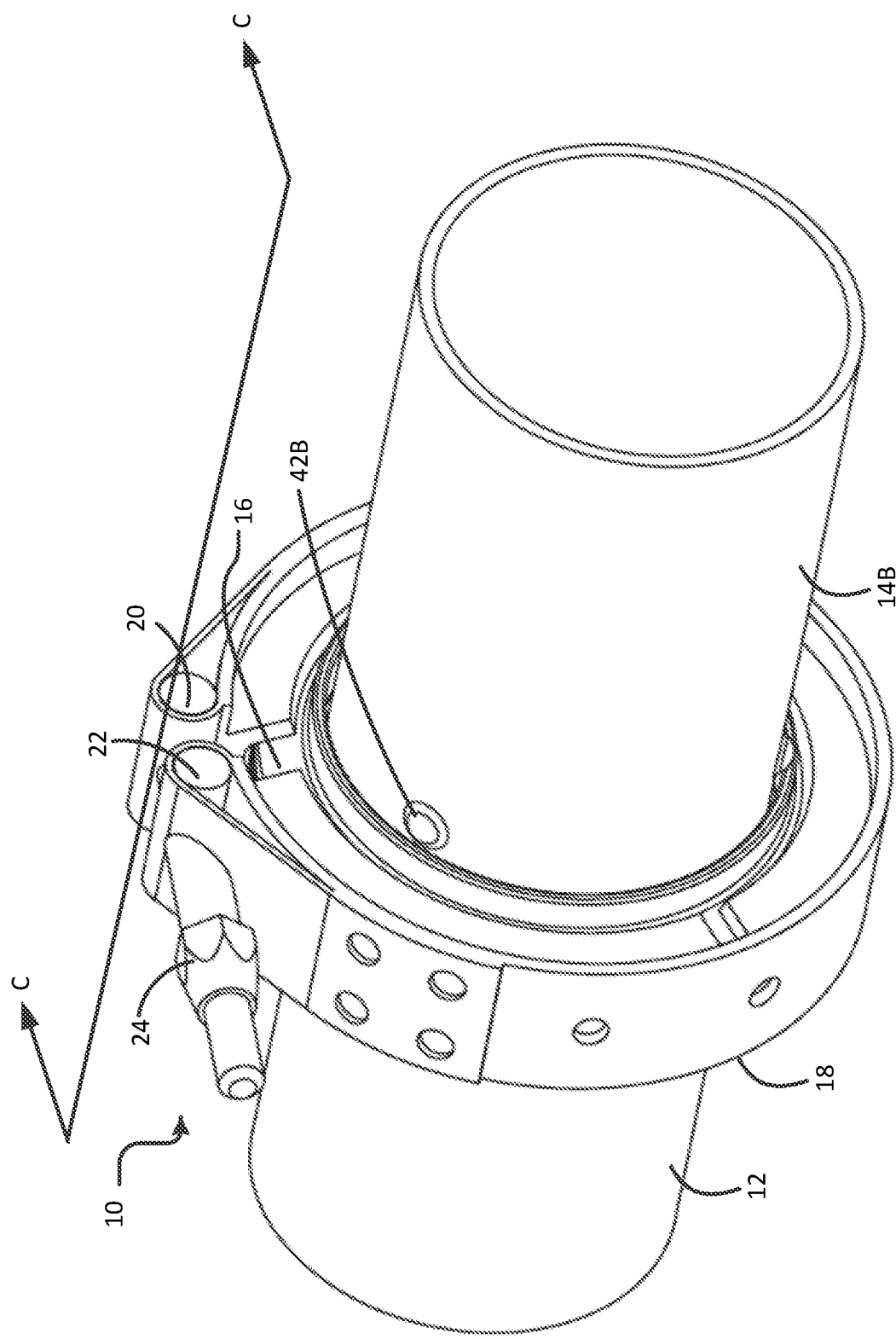
FIG. 6 is a perspective view of the clamp system of FIG. 1 used in connection with a connecting member having one or more protuberances in accordance with an embodiment of the present disclosure.
Figure 7:
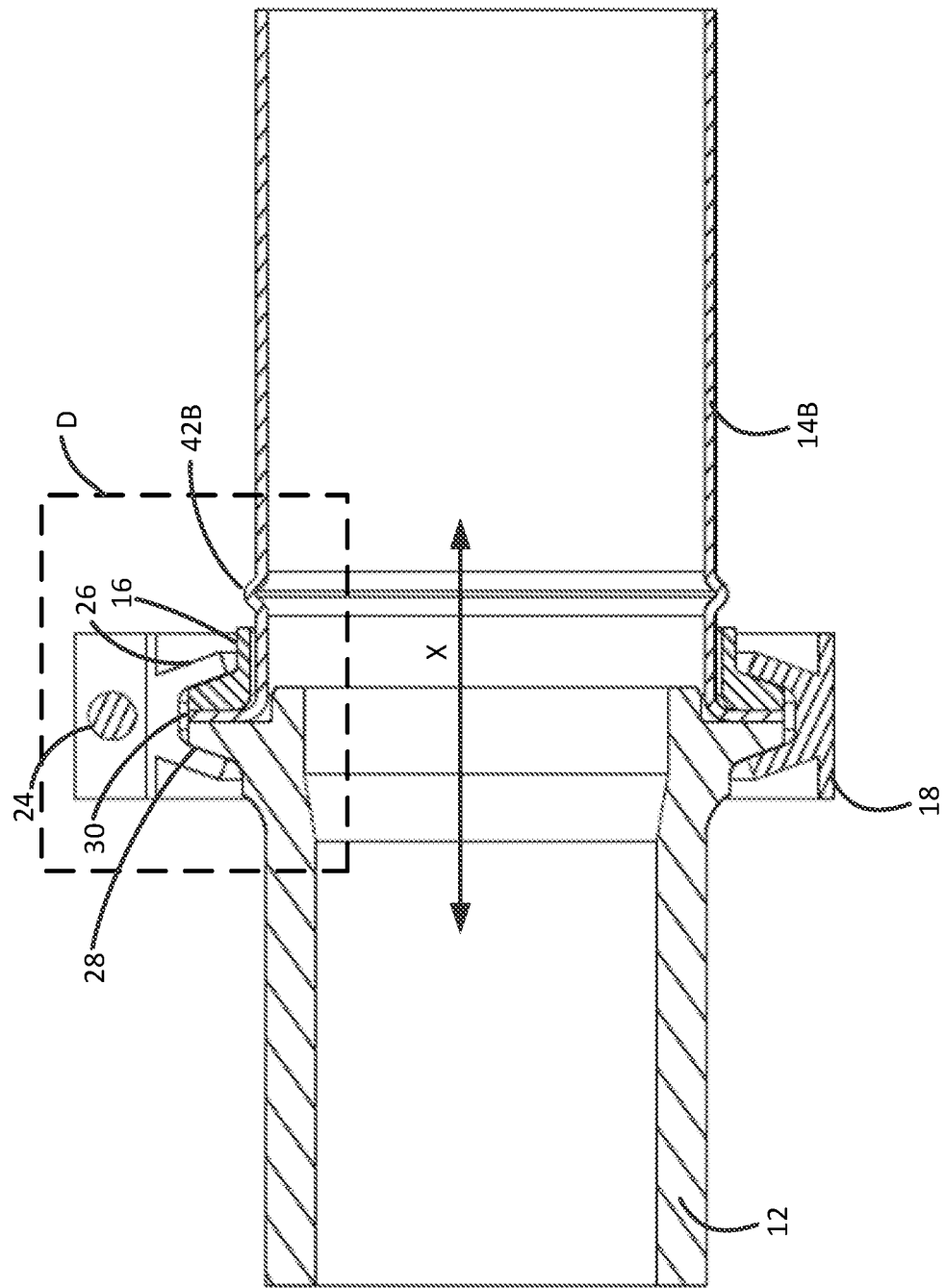
FIG. 7 is a vertical cross-sectional view of the clamp system of FIG. 6 taken along the line B-B in accordance with an embodiment of the present disclosure.
Figure 8:
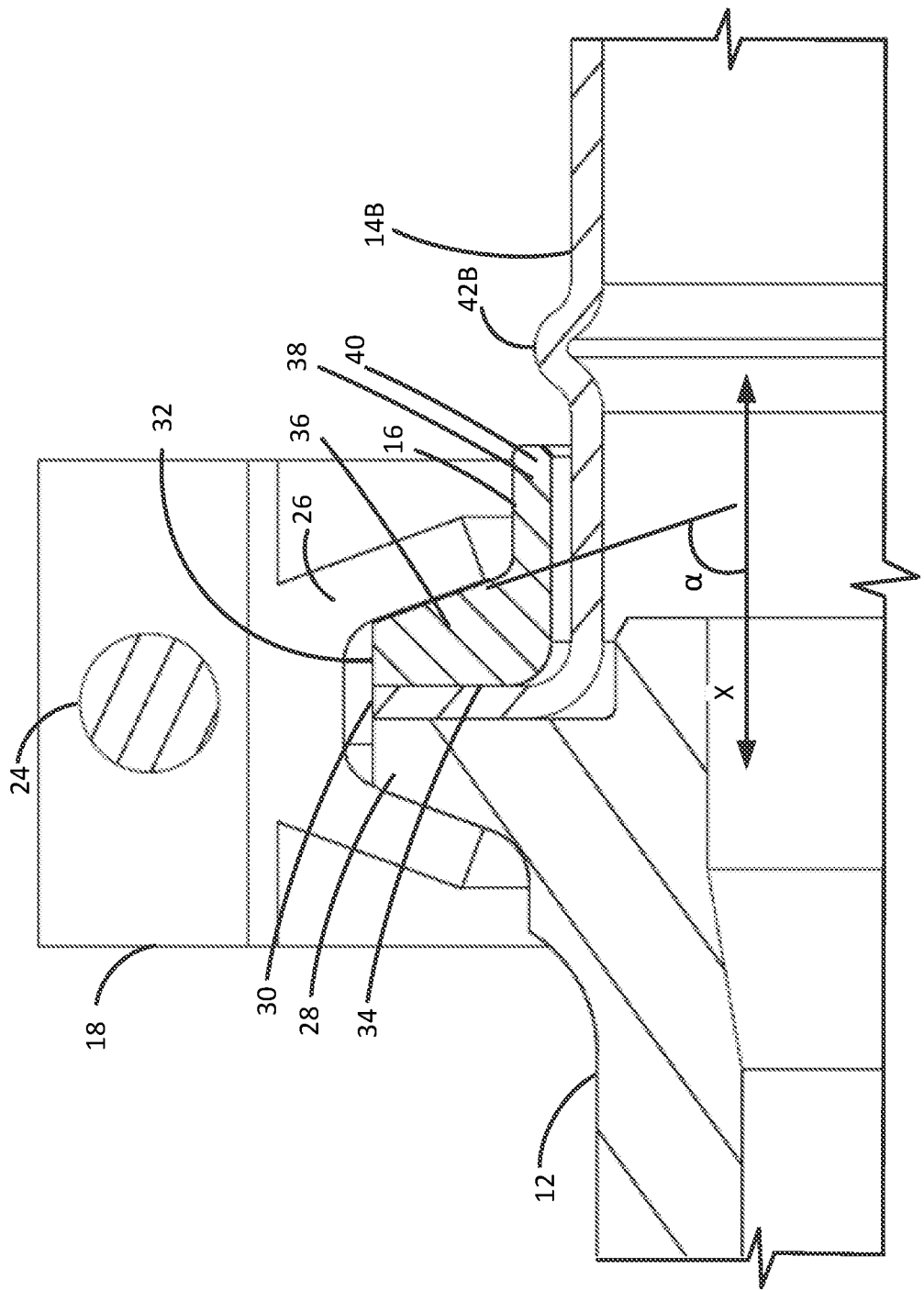
FIG. 8 is an enlarged schematic, cross-sectional view of a portion D of the clamp system of FIG. 7 in a clamped position in accordance with an embodiment of the present disclosure.

Referring now to FIGS. 6-8, clamp system 10 is used in connection with another type of second connecting member 14B having one or more protuberances 42B. Like elements shown in FIGS. 1-4 are designated with identical reference numerals. In this illustrated embodiment, distal end 40 of flange portion 38 is configured to bias against one or more protuberances 42B associated with second connecting member 14 to limit axial movement of connecting ring 16 when connecting ring 16 is displaced during use or installation. Principles described above in relation to clamp system 10 are also applied in this illustrated embodiment.

Embodiments of the present disclosure are described above by way of example only, with reference to the accompanying drawings. Further, the previous description is merely exemplary in nature and is in no way intended to limit the disclosure, its application, or uses. Thus, while this disclosure includes particular examples and arrangements of the units, the scope of the present system should not be so limited since other modifications will become apparent to the skilled practitioner.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein.

What is claimed is:

1. An assembly including two connecting members and a clamp system for providing secure attachment of the two connecting members, the assembly comprising:
    a connecting ring including a radial ring portion and a flange portion, the flange portion extending in an axial direction relative to a longitudinal axis of the connecting ring, and the radial ring portion having a planar wall transverse to the longitudinal axis of the connecting ring; and
    a coupling clamp configured to create a force for the clamp system when the coupling clamp is fastened with the connecting ring to seal the two connecting members to each other, the coupling clamp having a segment radially extending from an inner surface of the coupling clamp and defining a gap into which the radial ring portion of the connecting ring and two connecting members are receivable;
    wherein the connecting ring contacts an adjacent one of the two connecting members only along the planar wall of the connecting ring.

2. The assembly of claim 1, wherein the first connecting member is rigid and the second connecting member is flexible;
    wherein the flange portion extends past the segment of the coupling clamp during assembly and clamping of the clamp system without inhibiting the flexibility of the second connecting member.

3. The assembly of claim 1, wherein the clamp system transitions between a clamped position and an unclamped position.

4. The assembly of claim 3, wherein the clamp system transitions between a clamped position and an unclamped position, and wherein at least one of:
    when the clamp system is in the unclamped position, a first gap distance between the connecting ring and the coupling clamp is greater than a second gap distance between the connecting ring and a protrusion associated with one of the two connecting members; and
    when the clamp system is in the clamped position, the two connecting members are sealed together by the connecting ring and the coupling clamp is in a secured condition.

5. The assembly of claim 3, wherein when the clamp system is in the unclamped position, the connecting ring and the coupling clamp are in a loose condition.

6. The assembly of claim 1, wherein the radial ring portion has a radial-extending height to define a gap between the flange portion and the second connecting member when the clamp system is assembled.

7. A system, comprising:
two connecting members including a first connecting member and a second connecting member having a protrusion; and
a clamp system configured to provide a seal between the first and second connecting members, the clamp system comprising:
a connecting ring comprising:
a radial ring portion having a planar wall substantially transverse to a longitudinal axis of the connecting ring, and an opposite inclined wall sloped at an angle relative to the longitudinal axis; and
an axial flange portion extending in an axial direction relative to the longitudinal axis of the connecting ring, and configured such that when the connecting ring is moved or displaced by external forces during use or installation, a distal end of the axial flange portion is axially shiftable relative to the two connecting members toward the protrusion of the second connecting members; and
a coupling clamp configured to apply a force to create the seal between the first and second connecting members when the coupling clamp is fastened with the connecting ring;
wherein the coupling clamp includes a segment radially extending from an inner surface of the coupling clamp and defining a gap into which the connecting ring and the first and second connecting members are receivable;
wherein the connecting ring contacts the second connecting member only along the planar wall of the connecting ring when the coupling clamp applies the force to create the seal between the first and second connecting members.

8. The system of claim 7, the connecting ring further comprises an inclined wall sloped away from the planar wall at an angle relative to the longitudinal axis of the connecting ring;
wherein the axial flange portion extends from an end of the inclined wall such that the axial flange extends past the segment of the coupling clamp during assembly and clamping of the clamp system.

9. The of claim 7, wherein a distal end of the axial flange portion is configured to bias against the protrusion associated with the second connecting member used in the clamp system to limit the axial movement of the connecting ring when the connecting ring is displaced.

10. The system of claim 9, wherein the connecting ring has a clearance between the axial flange portion and the protrusion of the second connecting member directly facing the connecting ring when assembled.

11. The system of claim 10, wherein the clearance is shorter than a gap distance between the connecting ring and the segment radially extending from an inner surface of the coupling clamp when the clamp system is in a loose condition.

12. The system of claim 11, wherein the distance between the connecting ring and the segment of the coupling clamp when the clamp system is in the loose condition is determined based on an axial distance of inner edges of the segment and a total width associated with the connecting ring and the first and second connecting members used in the clamp system.

13. The system of claim 12, wherein the total width equals a first width associated with the first connecting member, a second width associated with the second connecting member, and a third width associated with the connecting ring.

14. The system of claim 13, wherein the first width includes a width of a first flange of the first connecting member, the second width includes a width of a second flange of the second connecting member, and the third width includes a width of the radial ring portion of the connecting ring.

15. The system of claim 11, wherein an axial length of the axial flange portion is determined based on the clearance between the axial flange portion and the protrusion associated with the second connecting member, and the gap distance between the connecting ring and the segment of the coupling clamp.

16. The system of claim 7, wherein the second connecting member further comprises a curved portion between a flange of the second connecting member and the protrusion of the second connecting member, the curved portion does not contact the flange of the second connecting member; and
wherein the radial ring portion of the connecting ring has a radial-extending height to define a gap, the gap defined by a surface extending from the axial flange portion to a first end of the planar wall, and the second connecting member when the clamp system if assembled.

17. A system comprising:
at least two connecting members including a first connecting member, the first connecting member including a first flange;
a second connecting member, the second connecting member including a second flange; and
a clamp system for providing a seal between the first and second connecting members, the clamp system comprising:
a connecting ring, the connecting ring comprising:
a radial ring portion having a planar wall substantially transverse to a longitudinal axis of the connecting ring, and an opposite inclined wall sloped at an angle relative to the longitudinal axis; and
a flange portion extending in an axial direction relative to the longitudinal axis of the connecting ring; and
a coupling clamp configured to apply a force in the axial direction to the first flange, the second flange, and the radial ring portion such that the first flange and second flange seal against each other and such that the connecting ring contacts the second flange only along the planar wall of the connecting ring when the coupling clamp is fastened with the connecting ring.

18. The system of claim 17, wherein the coupling clamp has a segment radially extending from an inner surface of the coupling clamp and defining a gap into which the radial ring portion of the connecting ring, the first flange, and second flange are receivable.

19. The system of claim 17, wherein the coupling clamp further comprises a V-shaped segment configured to apply the force in the axial direction to form contact between the planar wall of the connecting ring and the second flange of the second connecting member;

wherein when the connecting ring is moved or displaced by external forces during use or installation, a distal end of the flange portion is axially shiftable relative to the at least two connecting members toward the protrusion of the second connecting members.

20. The system of claim 17, wherein the first connecting member, the second connecting member, the coupling clamp, and the connecting ring are annular.

\* \* \* \* \*